(12) United States Patent
Hsiao

(10) Patent No.: US 10,883,610 B1
(45) Date of Patent: Jan. 5, 2021

(54) FLUID ACTUATION SYSTEM

(71) Applicant: Chung Ji Hsiao, San Gabriel, CA (US)

(72) Inventor: Chung Ji Hsiao, San Gabriel, CA (US)

( * ) Notice: Subject to any disclaimer, the term of this patent is extended or adjusted under 35 U.S.C. 154(b) by 2 days.

(21) Appl. No.: 16/458,383

(22) Filed: Jul. 1, 2019

(51) Int. Cl.
| B60S 5/04 | (2006.01) |
| F16K 1/30 | (2006.01) |
| F16K 3/18 | (2006.01) |
| F16K 39/04 | (2006.01) |
| F16K 21/02 | (2006.01) |

(52) U.S. Cl.
CPC ............... *F16K 1/303* (2013.01); *B60S 5/04* (2013.01); *F16K 3/182* (2013.01); *F16K 21/02* (2013.01); *F16K 39/045* (2013.01)

(58) Field of Classification Search
CPC ........ F16K 15/04; F16K 21/02; F16K 37/407; F16K 37/22; B65D 83/20; B65D 83/224; B65D 83/226; B65D 83/24; B65D 83/303
See application file for complete search history.

(56) References Cited

U.S. PATENT DOCUMENTS

| 2,598,308 | A |   | 5/1952  | Samuels et al. |           |
|-----------|---|---|---------|----------------|-----------|
| 2,921,722 | A |   | 1/1960  | Focht          |           |
| 3,137,414 | A |   | 6/1964  | Steinkamp      |           |
| 3,178,077 | A |   | 4/1965  | Benedetto      |           |
| 3,314,577 | A | * | 4/1967  | Doblin ............ | B65D 83/24 |
|           |   |   |         |                | 222/402.14 |
| 4,381,065 | A |   | 4/1983  | Hayes          |           |
| 4,568,002 | A |   | 2/1986  | Weinstein et al. |         |
| 4,895,190 | A | * | 1/1990  | Gillen ............ | B60H 1/00585 |
|           |   |   |         |                | 141/1 |
| 4,941,600 | A |   | 7/1990  | Berriochoa et al. |       |
| 5,154,323 | A | * | 10/1992 | Query ............ | B65D 83/205 |
|           |   |   |         |                | 222/153.11 |
| 5,503,303 | A |   | 4/1996  | LaWare et al.  |           |
| 5,702,036 | A |   | 12/1997 | Ferrara, Jr.   |           |
| 5,765,601 | A |   | 6/1998  | Wells et al.   |           |
| 5,791,524 | A |   | 8/1998  | Demarest       |           |
| 6,062,432 | A |   | 5/2000  | Estrada        |           |
| 6,126,044 | A |   | 10/2000 | Smith          |           |
| 6,260,739 | B1|   | 7/2001  | Hsiao          |           |
| 6,382,469 | B1|   | 5/2002  | Carter et al.  |           |
| 6,708,849 | B1|   | 3/2004  | Carter et al.  |           |
| 8,333,304 | B1|   | 12/2012 | Haage          |           |
| 9,242,416 | B1|   | 1/2016  | Ohm et al.     |           |
| 10,124,952| B2|   | 11/2018 | Williams       |           |
| 10,611,105| B2| * | 4/2020  | Costle ............ | F16K 35/025 |
| 2005/0167528 | A1 | * | 8/2005 | Hsiao ............ | B65D 83/303 |
|           |   |   |         |                | 239/302 |
| 2010/0025437 | A1 | * | 2/2010 | Oshimo ............ | B65D 83/24 |
|           |   |   |         |                | 222/402.13 |
| 2011/0068132 | A1 |   | 3/2011 | Kou            |           |

* cited by examiner

*Primary Examiner* — Hailey K. Do
(74) *Attorney, Agent, or Firm* — Rosenberg, Klein & Lee

(57) ABSTRACT

A fluid actuation system controls fluid flow between a container and the external environment. The fluid actuation system has an actuator housing which houses a cradle member secured to the actuator housing. An actuator member is slidably received within the cradle member with the actuator member having an actuator member flow conduit for communication fluid flow from the container to and external environment. A toggle latch member is moveable to a first position for continuous fluidic transfer, to a second position for manual control of the fluidic flow, or a third position when fluidic flow is blocked.

19 Claims, 10 Drawing Sheets

FLUID ACTUATION SYSTEM

FIELD OF THE INVENTION

The present invention is related to fluid actuation systems adapted for controlling fluid flow from a high pressure source.

The present invention is further related to a fluid actuation system adapted to delivery systems for delivering to the interior of a tire a high pressure air or gaseous material for expandable compositions adapted to inflate and typically seal a tire or tube within the tire.

The present invention is further directed to the field of tire inflation systems and particularly, to connection valves and interlocks of an aerosol tire sealant and inflator system.

The present invention is further directed to the field of improved interlock fluid actuation systems employing a manually activated pushbutton with a deployable latch configured to lock the system in a continuous flow of fluid in an activation position, as well as providing a manually determinable amount of fluid to be dispensed from a high pressure source.

This invention pertains generally to the field of dispensing, and more particularly, to a fluid actuation system which controls fluid flow in a continuous, or intermittent manner.

This invention is still further directed to gaseous inflation systems which include pressure retaining containers, and associated delivery systems for delivering to the interior of a tire, high pressure fluidic compositions in the nature of high pressure air and/or sealant compositions.

This invention further is directed to a fluid actuation system whereby a locking pin is releasably coupled to a cradle member for bearing against a lower surface of an actuator member to maintain a toggle latch member in abutting relation to an upper surface of the actuator member for terminating any flow of fluid or gaseous material from a high pressure source to a tire or other object to be inflated.

Further this invention relates to fluid actuation system where a toggle latch member which is displaceable with respect to an actuator member to permit manual control of fluidic material flow from a high pressure container to an external environment such as a tire to be inflated and/or sealed.

Still further, this is an invention which pertains to the field of providing a fluid actuation system which has a tire valve adapted for insertion and release of air from a tire with a tire valve connector for engaging the tire valve.

This invention is further directed to a fluid actuation system where a tire valve is adapted for insertion and release of air from a tire with a check valve mechanism for interfacing with the tire valve on one end and a fluid flow hose on an opposing end, whereby fluid flow is transmitted to the tire when air, gas, or other fluidic compositions where pressure in a closed container is greater than the air or gas pressure in a tire whereby fluid flow from an aerosol can is terminated when air pressure within an aerosol can is terminated when air pressure in the tire is greater than the air or gas pressure in the aerosol can.

The present invention is further directed to the field of an improved interlock system which employs a manually activated pushbutton with a deployable latch configured to temporarily lock the pushbutton in an activation position.

BACKGROUND OF THE INVENTION

Fluidic actuation systems inflator systems for inflating objects have been used in the prior art for inflation of objects for a variety uses.

Further fluidic actuation systems are well-known in the art to provide a mechanism for partially inflating and/or sealing flat tires or other objects. When tires are deflated as a result of being punctured, the sealant provides a patch to seal the tire. Aerosol tire sealant inflators are known to contain sufficient pressure to partially inflate a standard tire which permits a vehicle to be driven to a repair facility for determination if a new tire or permanent fix to the tire is required.

In many cases where a person has a vehicle deflated or partially deflated tire, the need is to inflate and/or seal the puncture or other aperture in the tire in a safe, simple and non-cumbersome manner due to the fact that such problems often are encountered in traffic bearing areas adjacent a roadway which necessitates the person to quickly and simply inflate/seal the tire in an expeditious manner.

PRIOR ART

Prior art systems are known for providing fluid actuation systems for controlling fluid flow from a high pressure or aerosol can. In some prior art systems, the operator utilizes a pressurized container must maintain his/her fingers in pressure contact with the valve stem during use.

In some prior art systems, a toggle latch is provided for maintaining a continuous flow of high pressure fluid from the aerosol can. Such prior art systems, as is seen in U.S. Patent Application Publication No. 2011/0068132 do not permit manual displacement of an actuating member to allow intermittent pressure fluid to flow through the fluid actuation system.

Some of the prior art systems providing differing latch members adaptable to an aerosol tire sealant inflator are provided in U.S. Pat. Nos. 9,242,416, 6,708,849; 6,382,469; and, 6,126,044. However, none of these latching mechanisms provide for the 1) continuous flow of high pressure fluid; 2) intermittent flow at the discretion of an operator; or 3) a termination of all fluid flow at the discretion of the user.

Prior art systems as described in US Patent Publication No. 2011/0068132 provide for either continuous flow of fluid from a pressurized container to a tire to be inflated and/or sealed, however such prior art does not provide for the combination of continuous flow of high pressure gaseous flow, termination of flow of the gaseous fluid, and the mechanism necessary for the user to intermittently and manually control the fluid flow from the pressurized container.

Further such prior art systems do not provide for a displaceable locking device to maintain the fluid actuation system in a secure deactivating state prior to use of the fluid actuation system being operationally activated for inflating and/or sealing an object to be inflated/sealed.

Further such prior art systems using a toggle latch element do not control the extent to which a toggle latch member can be displaced to provide a continuous flow of inflatable/sealing gaseous fluid.

An additional drawbacks associated with prior art systems is the difficulty in obtaining a positive seat with the valve stem of a tire when the valve connector is not properly attached.

SUMMARY OF THE INVENTION

A fluid actuation system is provided which is adapted for controlling fluid flow from a container containing high pressure gaseous fluidic contents. The fluid actuation system includes an actuator housing which may be releasably fixed to the container which in some instances can be an aerosol can containing fluidic contents under high pressure. A cradle member is fixedly secured to the actuator housing with an actuator member slideably insertable within the cradle member for reversible displacement in a vertical direction. The actuator member has a flow conduit in open fluid communication with the container and an external environment. A displaceable toggle latch member is in contact with an upper surface of the actuator member and can be displaced to a first position for continuous flow of fluid is transmitted from the container to the external environment or to an adjustable second position for manual control of the amount of fluid transmitted from the container, or a third position where flow of fluid transmitted from the container is terminated.

An object of the subject system is to provide controlled fluidic flow from a container to an external environment.

An object of the subject system is to provide a fluid actuation system which is adapted to control fluid flow from a container containing gaseous fluidic compositions to an external environment.

A further object of the subject system is to provide a controlled fluidic flow from a container where the fluid flow may be maintained in a continuous as well as an intermittent basis.

A still further of the subject system is to provide a controllable fluidic flow from a container which is operationally selective between a continuous flow, intermittent flow and a termination of all flow through the fluid actuation system.

An additional object of the subject system is to provide a fluid actuation system which fluidly communicates between a container containing fluidic material under relatively high pressure to a tire to be inflated and/or sealed responsive to a tire puncture, slit or other aperture which degrades the tire's structural integrity.

A further object of the fluid actuation system is to provide a controllable fluidic flow from a high pressure container to a tire to be inflated/sealed in a quick attachment and detachment manner.

An object of the subject invention is to provide a fluid flow hose having opposing ends where one end has a tire valve connector for engaging a tire valve including a check valve mechanism which permits flow of gaseous sealant/ inflation compositions into the tire when the tire has an air pressure less than the gaseous pressure within the container and terminates the flow when the tire pressure is greater than the gaseous pressure within the container.

DESCRIPTION OF THE PREFERRED EMBODIMENTS

Figure 1A:
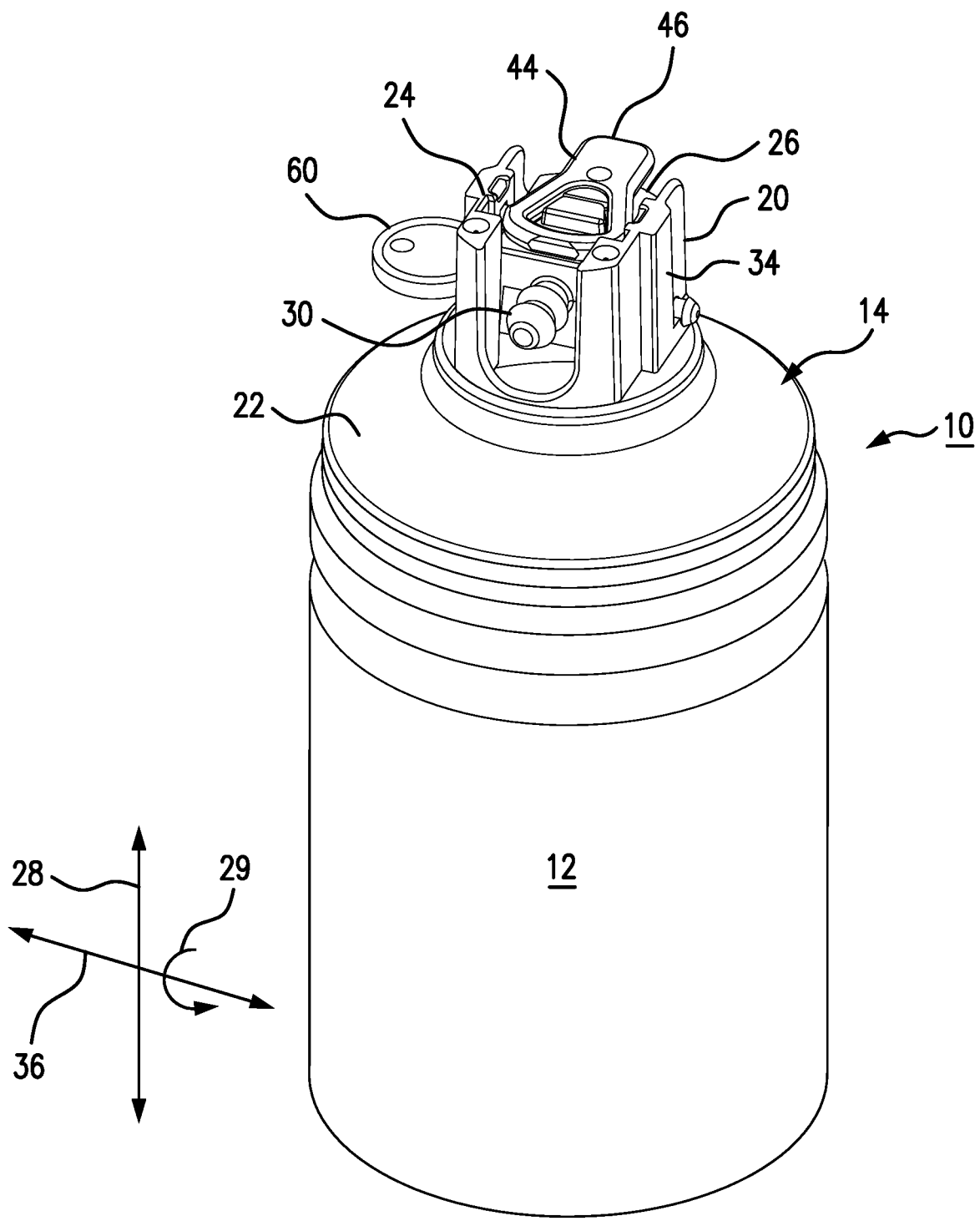
FIG. 1A is a perspective drawing of the subject fluid actuation system where a toggle latch member is in a third position restricting flow of fluidic material transfer.
Figure 1B:
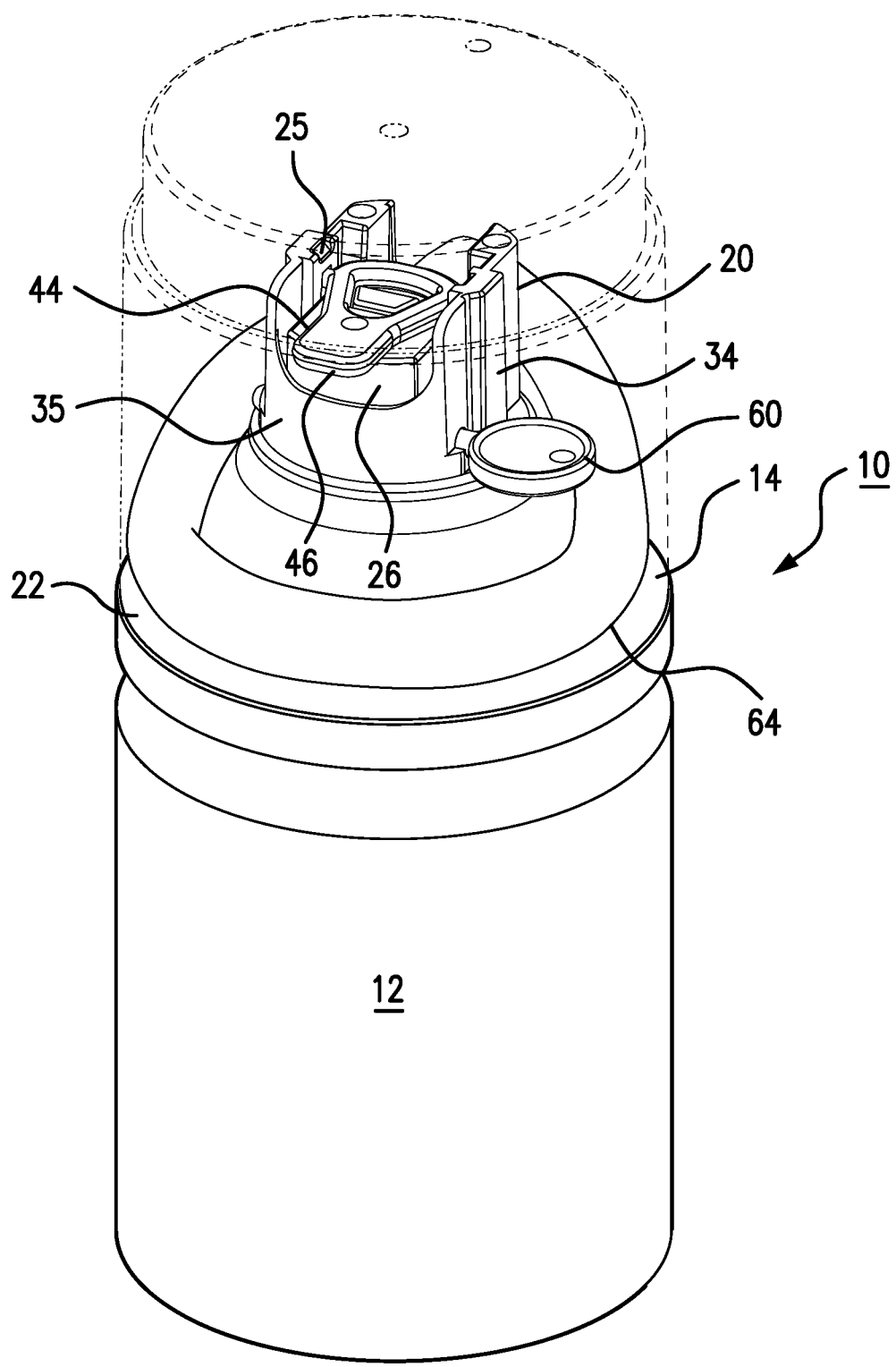
FIG. 1B is a perspective view of the fluid actuation system as depicted in FIG. 1A in an opposing direction where the toggle latch member is in the third position and showing a cap member mounted on an aerosol can.

Referring now to FIGS. 1A-1B, there is shown a fluid actuation system 10 for controlling fluid material flow from a high pressure container 12. The container 12 contains gaseous material compositions and possibly tire sealant compositions for transmission through fluid actuation system 10 to an external environment which may be a vehicle tire. The container 12 generally contains the fluidic material at a high pressure and may be in the form of an aerosol can. In the manner as proposed in the following paragraphs, fluidic material is passed from the high pressure container 12 through the fluid actuation system 10 to the external environment where fluidic material is applied to an object which may be a vehicle tire, having a pressure generally lower than the pressure of the fluidic material within the container 12.

Figure 3:
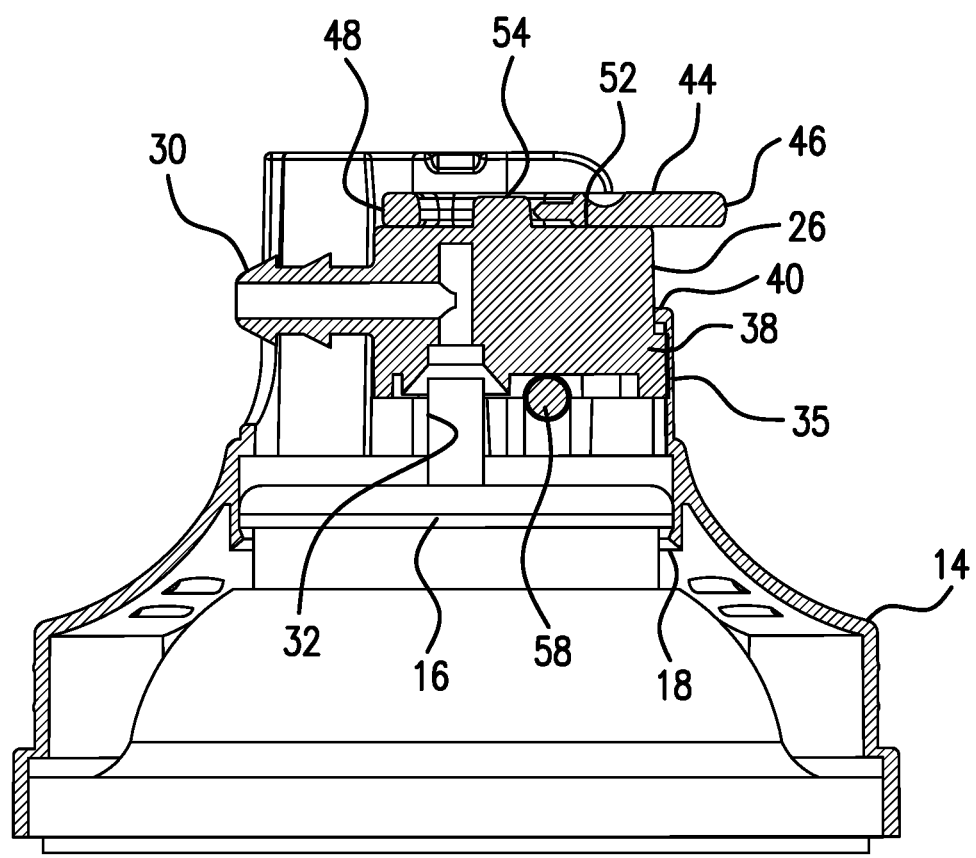
FIG. 3 is a cross-sectional elevational schematic view of a portion of the fluid actuation system showing the lock pin inserted into the system for obstructing flow of gas.
Figure 4:
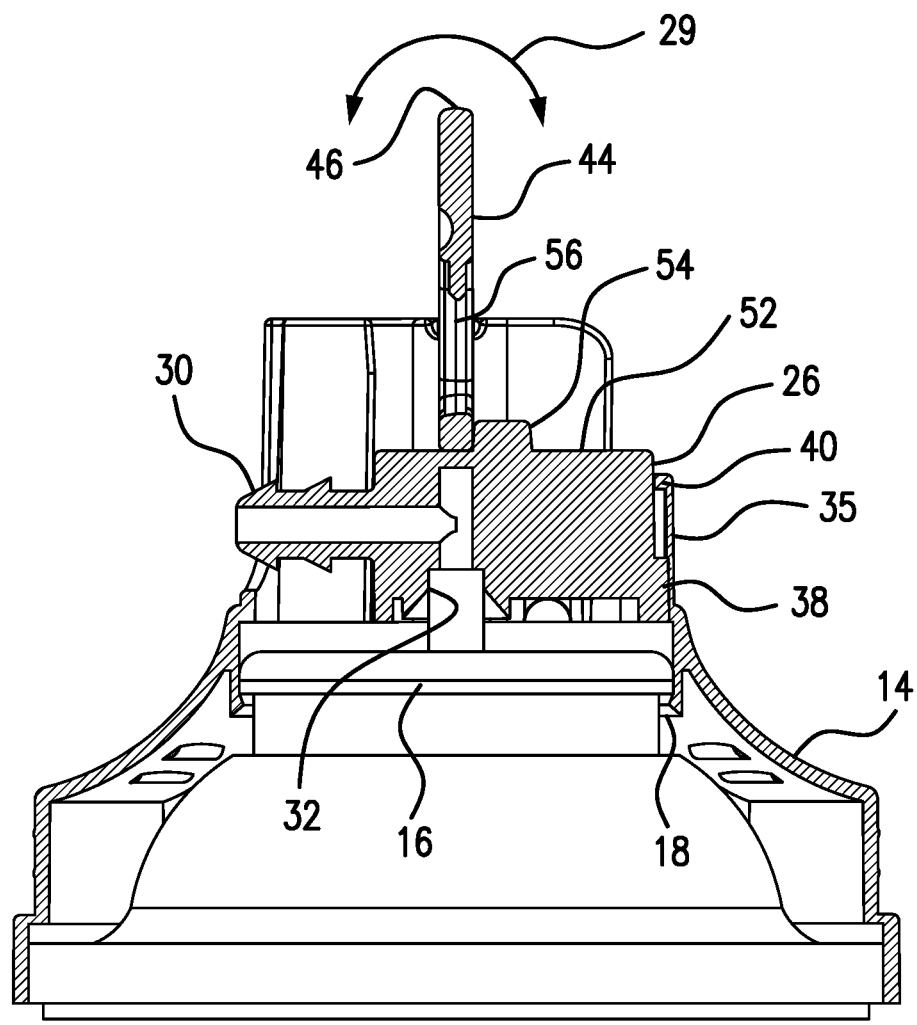
FIG. 4 is a cross-sectional view of a portion of the fluid actuation system with the lock pin removed and the toggle latch member positionally located in a first position to allow continuous flow of high pressure gas from a high pressure container through an actuator member flow conduit.
Figure 5:
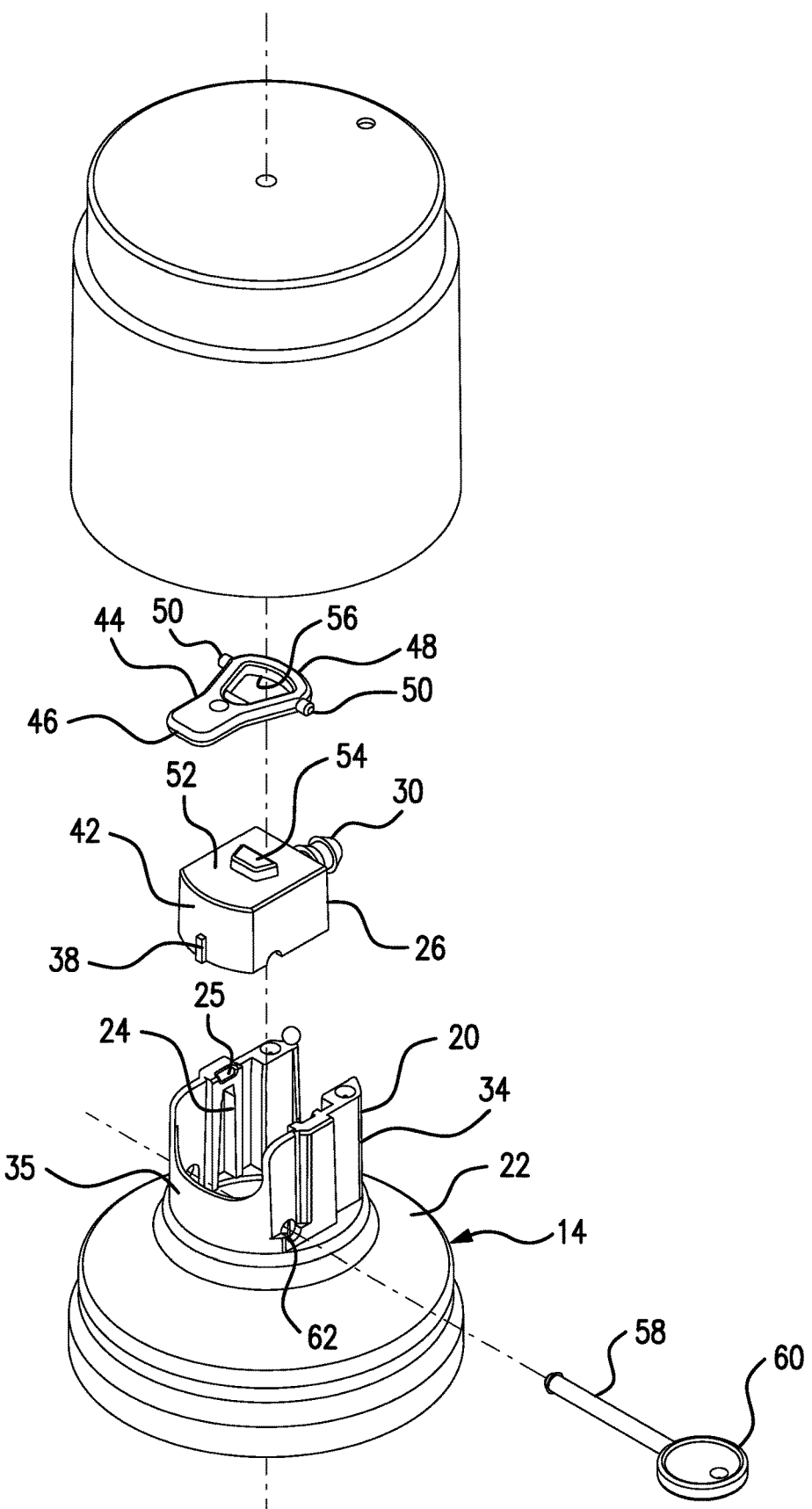
FIG. 5 is an exploded schematic view of the fluid actuation system.

In overall concept, fluid actuation system 10 includes the actuator housing 14, as is seen in the Figures, with a cradle member 20 clearly shown in FIGS. 3 and 5. The actuator member 26 is slidably insertable within cradle member 20 with the actuator member 26 having an actuator member flow conduit 30, seen in FIGS. 3-4 and 9 with the actuator member 26 having an actuator member flow conduit 30 for communication of fluidic material flow to the external environment.

Figure 6:
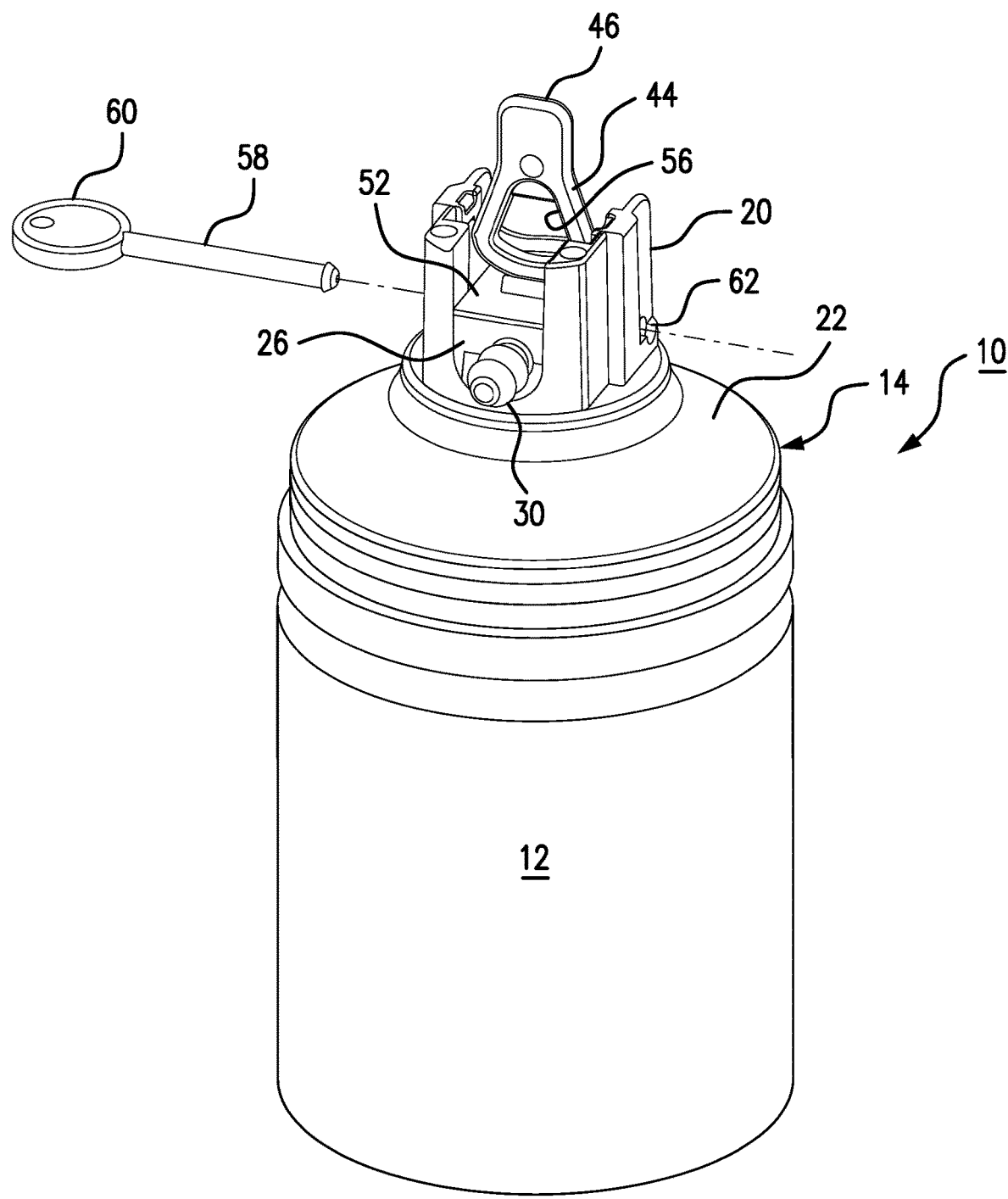
FIG. 6 is a schematic view of the fluid actuation system having the lock pin removed and permitting the toggle latch member to be displaced in the first position for permitting continuous flow of high pressure fluidic material.
Figure 9:
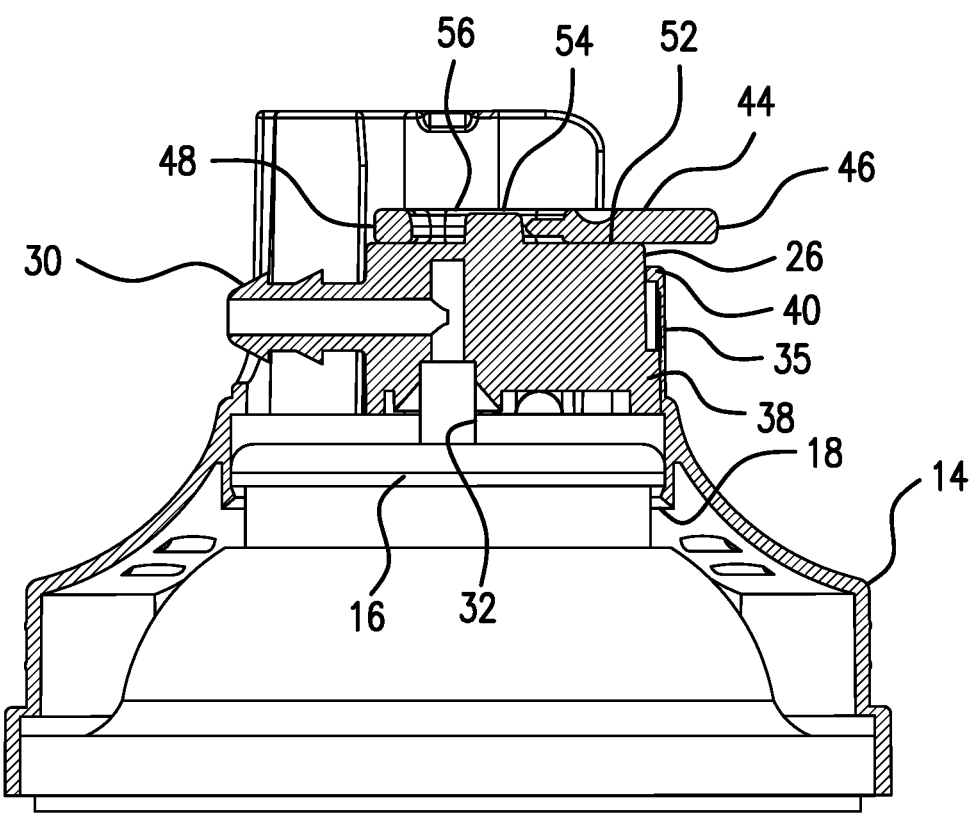

A toggle latch member 44 contacts an upper surface 52 of the actuator member 26 with the toggle latch member 44 being displaceable to a first position, second position, or third position. When the toggle latch member 44 is in the first position, as is shown in FIGS. 4 and 6, a continuous flow of fluidic material is transmitted from the container 12 to the external environment. When the toggle latch member 44 is in a second position which is adjustable manually by the user, as is shown in FIG. 9, the user may manually control the amount of the fluidic material being dispensed. When the toggle latch member 44 is in the third position, as is shown in FIGS. 1A-3, fluidic material flow is blocked from transmission through fluid actuation system 10.

Referring now to the individual elements associated and used in combination for the fluid actuation system 10, as shown clearly in FIG. 5, actuator housing 14 may be mounted to container 12 in the form of an aerosol can where actuator housing 14 is releasably attached to a container or can lip 16 through a pair of actuator housing flanges 18, as is seen in FIG. 3. In this manner, actuator housing 14 which may be snap-fit onto container lip 16, maintains actuator housing 14 in a releasably fixed positional relationship with respect to the container 12.

Actuator housing 14 may be formed of a plastic-like composition which is relatively flexible and permits the actuator housing flanges 18 to be snap-fit under container lip 16. In this manner, actuator housing 14 may be inserted and placed in a fixed positional relationship with respect to container 12 and is further flexibly mounted thereto in order to allow removal of the actuator housing 14 from the container or aerosol can 12.

Referring now to FIGS. 1-3 and 5, the cradle member 20 is fixedly secured to the actuator housing 14. The cradle member 20 may be adhered to actuator base surface 22 by some fixed adhesive or other structural interface, or formed in one-piece formation thereof.

The actuator member 26, as is seen in FIGS. 1-4 and 5, is slidably inserted within cradle member 20 and reversibly displaceable in a vertical direction 28. The actuator member 26 includes an actuator member flow conduit 30, once again seen in FIGS. 3 and 4 and 9, which permits fluid flow from the container 12 to the external environment.

Operationally, actuator member 26 is adapted to be in fluid communication with aerosol fluid conduit 32, as is seen in FIGS. 3-4 and 9. When actuator member 26 is displaced in vertical direction 28 and presses on aerosol fluid conduit 32, high pressure fluidic material, air, or other sealant gaseous material is passed through aerosol fluid conduit 32 into actuator member flow conduit 30 and passed to the external fluid actuation system 10. Standard aerosol cans 12 provide for aerosol fluid conduits 32 which, when displaced in vertical direction 28, will provide for release of high pressure air or fluidic material from container or aerosol can 12. When container 12 is an aerosol can, such is well-known in the art and will not be further described in following paragraphs.

Referring in particular to FIG. 5, actuator member 26 is mounted between cradle sidewalls 34 and is reversibly displaceable in vertical direction 28. Cradle sidewalls 34 are spaced apart each from the other in lateral direction 36 and are displaced each from the other in a manner which allows actuator member 26 to be slidably inserted between the displaced cradle sidewalls 34. Stability of actuator member 26 during displacement in vertical direction 28 may be maintained by actuator member lug element 38 which is slidably insertable within cradle connecting wall 35, as is seen in FIGS. 3-4 and 5. Actuator member 26 may be vertically displaced from a position shown in FIG. 4 to a position shown in FIG. 3 where actuator member lug element 38 is displaced to the upper flange 40 of actuator housing 14 and is captured therein.

Thus, in particular, with respect to FIG. 5, it is seen that actuator member 26 having the actuator member lug element 38 extending from the actuator member sidewall 42 is displaceable with respect to cradle member 20 and is controllably vertically displaceable within actuator housing 14. This maintains the stability of actuator member 26 within actuator housing 14, while maintaining and permitting reversible vertical displacement of actuator member 26.

Referring again to FIG. 5, toggle latch member 44 has toggle latch member first end 46 and toggle latch member second end 48 opposing toggle latch first end 46. Toggle latch member 44 has a pair of toggle latch pin elements 50 which are laterally opposing each other on opposing lateral sides of toggle latch member 44. Toggle latch pin elements 50 are vertically displaceable within cradle member channels 24 to provide displacement and rotation of toggle latch member 44 in rotational direction 29. In this manner, toggle latch member 44 is linearly reversibly displaceable with respect to cradle member 20 while allowing toggle latch member 44 to be rotated, as is seen in FIGS. 4 and 6.

Each of cradle member channels 24 of cradle member 20 includes a cradle stop member 25 as seen in FIG. 5. In this manner, the toggle latch member 44 and the actuator member 26 is captured within cradle member channels 24.

Toggle latch member 44 is in contact with upper surface 52 of actuator member 26 when toggle latch member 44 is in the first, second, or third positions. As seen in FIG. 4, toggle latch member 44 is rotated in rotational direction 29 into a position where it is extending in vertical direction 28. In this position, toggle latch member 44 bears fully against upper surface 52 of actuator member 26 forcing actuator member 26 against aerosol fluid conduit 32 to provide a continuous flow of fluidic material from container or aerosol can 12 through actuator member flow conduit 30 in a manner which maintains a continuous flow of fluidic material to the external environment.

Toggle latch member 44 may be displaced in a manual actuation in vertical direction 28, as shown in FIG. 9 to allow the fluidic material composition to be intermittently or otherwise controlled by a user. In this mode of operation, the actuator member 26 is displaced vertically with respect to actuator housing 14 when the user presses down on the toggle latch member 44, which rides within the cradle member channels 24 through the displacement of the toggle latch pin elements 50 (seen in FIG. 5) within the cradle member channels 24.

As seen in FIG. 3, toggle latch member 44 is positioned in the third position where a lock pin 60 is inserted through cradle member 20, as will be discussed in following paragraphs. In this mode of operation, actuator member 26 is maintained in a singular position which raises the actuator member 26 within the cradle member 20 to a position where flow is blocked from the container 12 to the actuator member flow conduit 30. In this positioning of the toggle latch member 44, the lock pin 60 maintains the positional relationship of the toggle latch member 44 with respect to the blocking of the fluidic material flow.

Lock pin 60 is adapted to be inserted through laterally displaced cradle openings 62, as is seen in FIG. 5 for maintaining the fluid actuation system 10 in a locked position, blocking any flow of fluidic material from container or aerosol can 12 through actuator member flow conduit 30. Lock pin 60 includes lock pin shaft 58 which is insertable through laterally displaced cradle openings 62, as is seen in FIGS. 1A, 3, and 5. Lock pin shaft 58 has an extended length which is greater than the distance between the cradle sidewalls 34 and is inserted laterally through the laterally displaced cradle openings 62. The lock pin shaft 58 bears against the underside of actuator member 26 and maintains the actuator member 26 in a vertically displaced position.

In this mode of operation, the toggle latch member 44 is continuously maintained in interfacing relationship with upper surface 52 of actuator member 26 with the actuator member stop element 54 extending through toggle latch member opening 56. Thus, toggle latch member 44 is maintained adjacent and contiguous with the upper surface 52 of the actuator member 26. In this mode of operation, actuator member 26 does not bear and put pressure on aerosol fluid conduit 32 and the flow from container 12 is blocked from passing or being transmitted through aerosol fluid conduit 32.

When lock pin 60 is removed from laterally displaced cradle openings 62, as is seen in FIGS. 4, 6 and 9, the fluid actuation system 10 is permitted to be used in the first position of the toggle latch member 44 for continuous flow of fluid or into the second position of the latch member 44 for manual control of the fluidic material flow.

When a continuous flow of fluidic material is required, as is seen in FIG. 4, toggle latch member 44 is rotated in rotational direction 29 for contacting the upper surface 52 of the actuator member 26 for forcing actuator member 26 in a vertically downward direction for displacing aerosol fluid conduit 32 for permitting continuous flow of the fluidic material. Toggle latch member 44 in this mode of operation can only be rotated through a 90° angle, since the toggle latch member second end 48 contacts the actuator member stop element 54. When an intermittent flow of fluidic material is required, toggle latch member 44 remains in contiguous contact with upper surface 52 of actuator member 26, and as seen in FIG. 9, actuator member 26 is displaceable into an adjustable vertical displacement for manual opening/closing of fluidic material through actuator member flow conduit 30. Second position of toggle latch member 44 permits user actuation of the fluidic material flow. The displacement of actuator member 26 is a function of the user's requirements and in this second position of the toggle latch member 44, actuator member 26 may be displaced functionally between the cradle sidewalls 34 of cradle member 20.

Finally, with respect to FIG. 3, where the lock pin shaft 58 extends through the laterally displaced cradle openings 62, actuator member 26 is maintained in a fixed position and does not bear against the aerosol fluid conduit 32 thereby blocking any of the fluidic material flow.

In this manner, the user may go from an intermittent flow of fluidic material as shown in FIG. 9 to a continuous fluidic material flow of the composition as shown in FIG. 4 as well as a complete blockage of flow of fluidic material as shown in FIG. 3 by insertion of lock pin 60 through the laterally displaced cradle opening 62.

Figure 2:
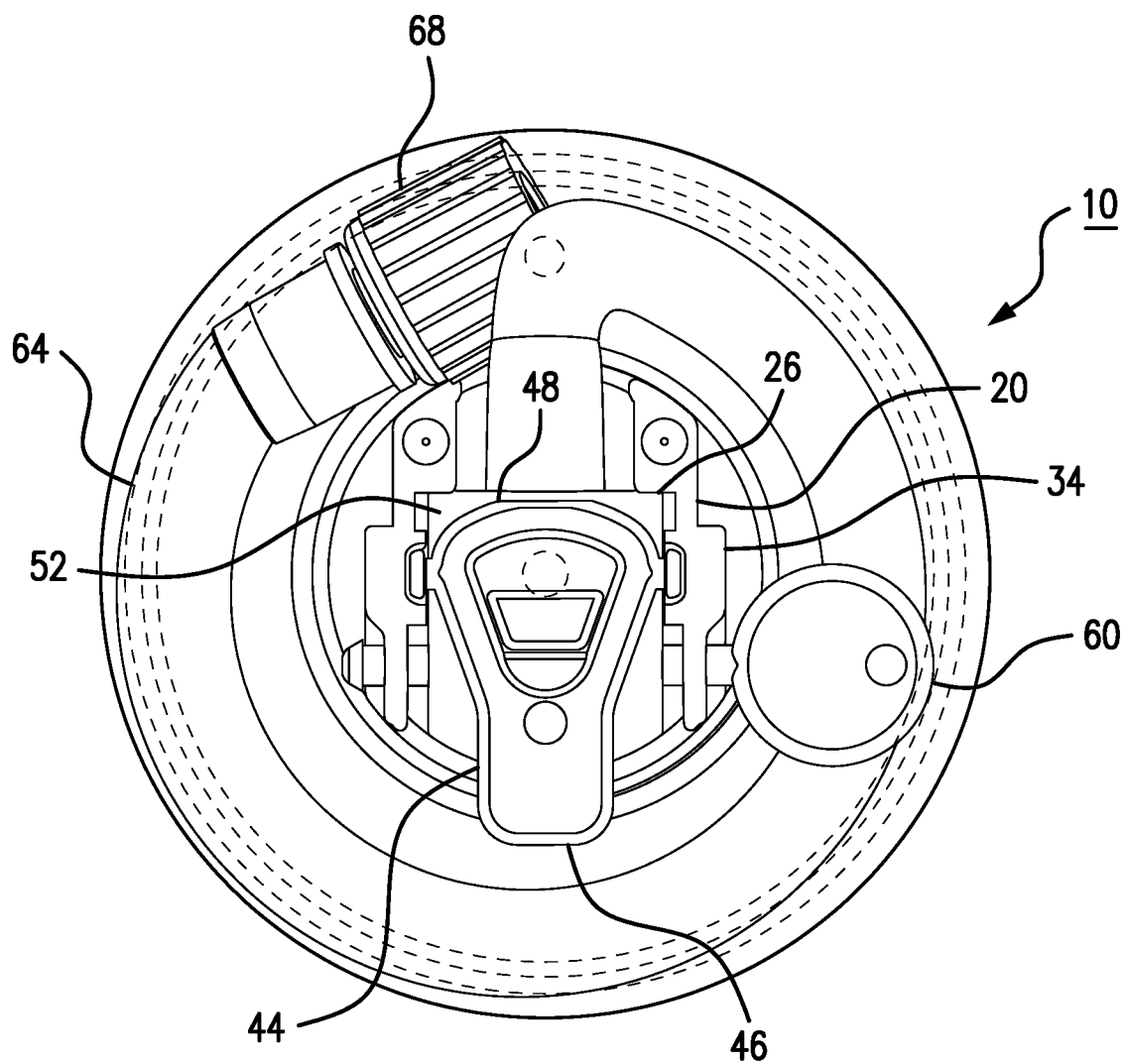
FIG. 2 is a top view of the fluid actuation system showing a lock pin in position where fluidic material is obstructed with respect to flow from a high pressure gas within a container to a tire valve connector.

Referring now to FIG. 2, the fluid actuation system 10 may include a fluid flow hose 64 for coupling to some external device such as a tire valve connector 68. Tire valve connector 68 is further described in the following paragraphs with respect to FIGS. 7A, 7B and FIG. 8. Fluid flow hose 64 may be mounted on actuator base surface 22 of actuator housing 14 in a surrounding manner to reduce the overall volume of the fluid actuation system 10. Fluid flow hose 64 is formed of some elastic type material such as a rubber composition or like composition not important to the inventive concept as herein described. Fluid flow hose 64 is coupled to actuator member flow conduit 30 as is seen in FIGS. 3-4 as well as FIG. 2.

Figure 7A:
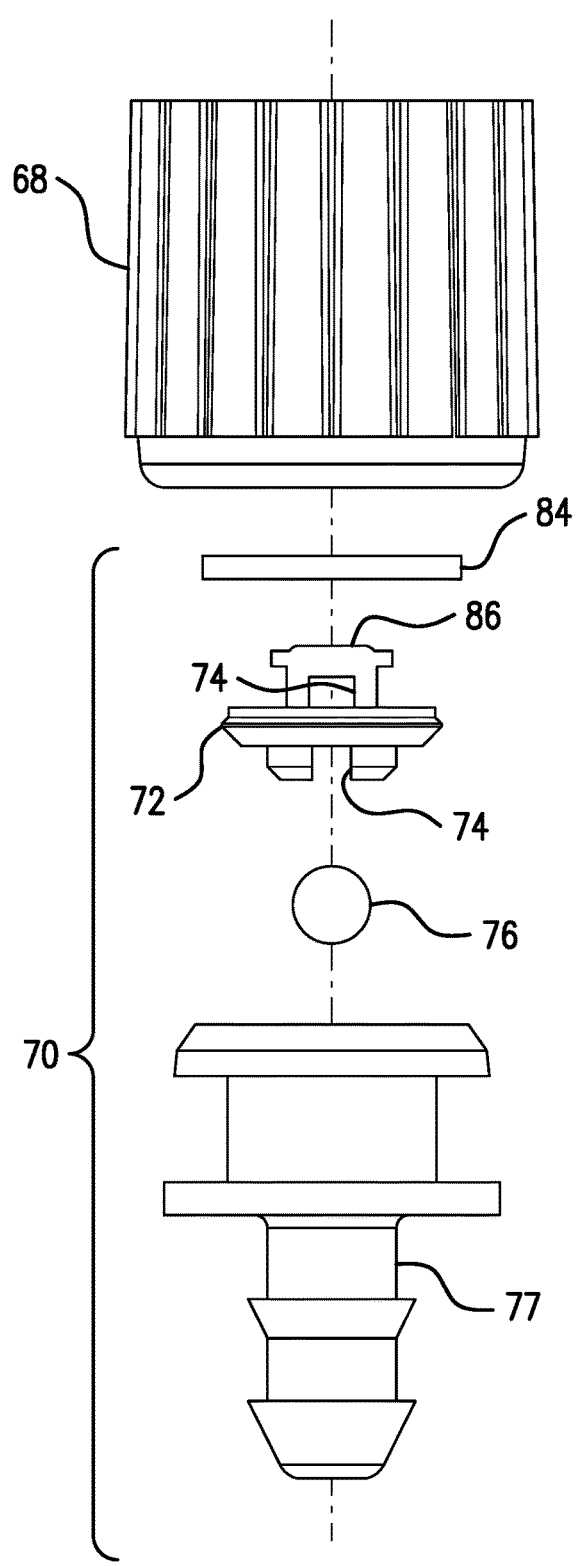
FIG. 7A shows an exploded schematic view of a tire valve connector and a check valve mechanism.
Figure 7B:
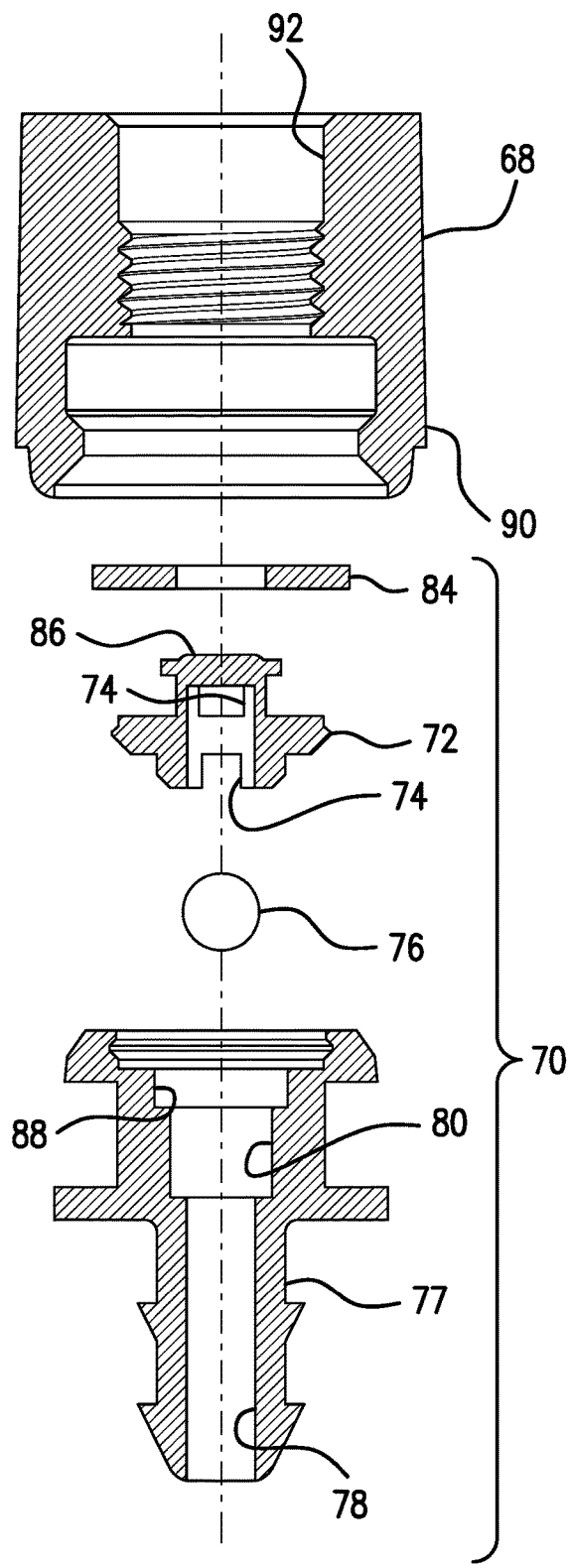
FIG. 7B is a cross-sectional exploded view of the tire valve connector and check valve mechanism.
Figure 8:
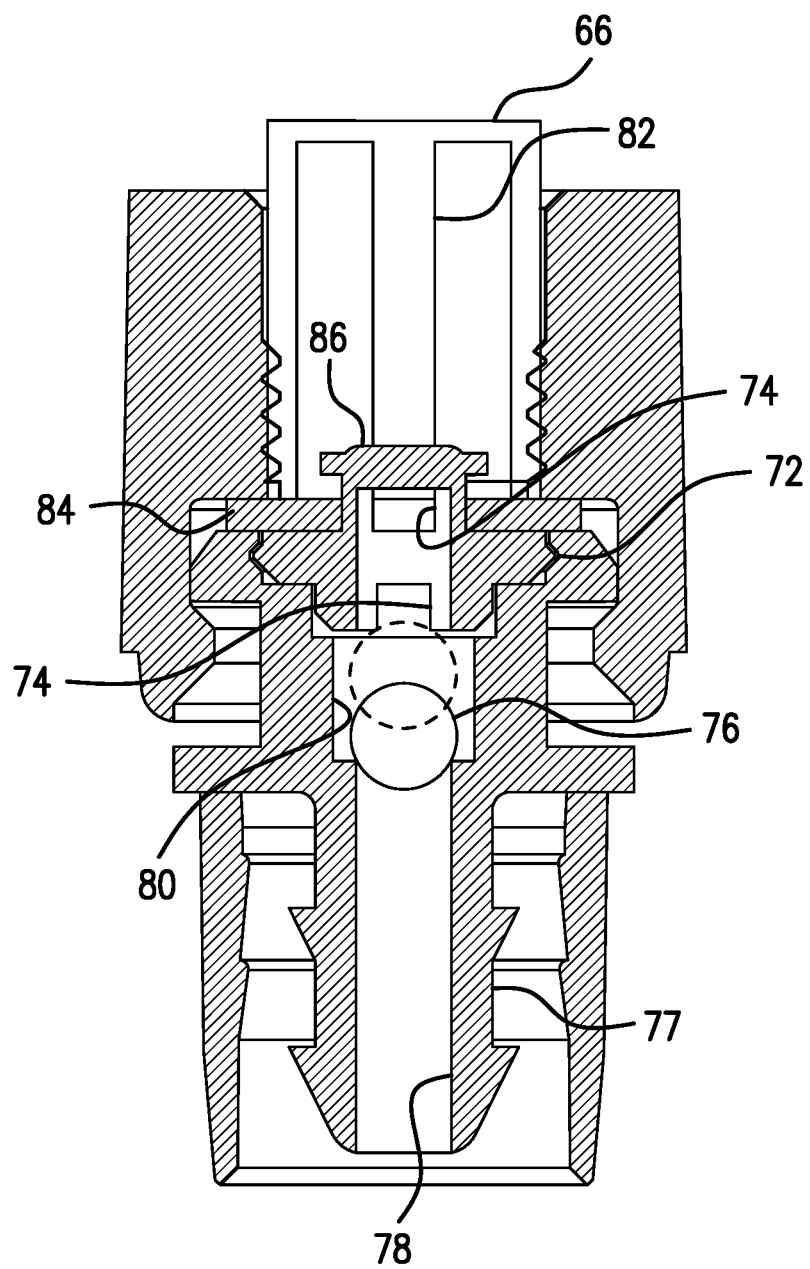
FIG. 8 is a cross-sectional view of the tire valve connector in combination with the check valve mechanism and the tire valve; and, FIG. 9 is a cross-sectional view of the fluid actuation system showing the toggle latch member in a second position for manually controlling fluidic material transfer.

Referring now to FIGS. 7A and 7B, there is shown tire valve 66, shown in FIG. 8, having a tire valve pin 82 of standard construction, well known in the art and not further described. The tire valve 66 is adapted for insertion and release of air from a standard tire. The tire valve connector 68, as seen in FIG. 7A-7B, provides for housing for engagement with tire valve 66 see in FIG. 8.

Check valve mechanism 70, seen in cross sections in FIG. 7B, is mounted within tire valve connector 68 and is threadedly mounted in a releasable manner to tire valve 66.

Check valve mechanism 70 interfaces with tire valve connector 68 on one end and fluid flow hose 64 on opposing end section. Fluid flow is transmitted to said tire valve 66 when air pressure in the container 12 is greater or higher than the air pressure in the tire and fluidic flow is blocked when air pressure in the tire or other object is greater than the air pressure in the container 12. As seen in FIG. 8, tire valve connector 68 may be threadedly connected to tire valve 66 for releasable coupling there between.

Check valve mechanism 70 includes a spool member 72 for controlling transmission of fluidic material from container 12 to tire valve 66 when air pressure in container 12 is higher or greater than air pressure in the tire. Check valve ball member 76 is displaceable in hose adapter 77 which is secured to spool member 72. Spool member 72 includes inlet/outlet ports 74 for allowing passage of air there through or blocking fluidic flow responsive to a pressure differential between the container 12 and the tire valve 66. Spool member 72 includes a spool upper surface 86 for engagement with tire valve pin 82 to open tire valve 66 when tire valve connector 68 is connected to tire valve 66.

Hose adapter 77 includes the hose adapter chamber 80 seen in FIG. 7B within which check valve ball member 76 resides in a displaceable mode of operation. When check valve ball member 76 is displaced into contact with hose adapter fluid flow conduit 78 as seen in FIG. 8, fluidic material flow is blocked from being transmitted to the tire. This positional placement is seen when the air pressure within the tire is greater than the pressure within the container 12. Alternately, when the air pressure in the container 12 is higher or greater than the pressure within the tire, check valve ball member 76 is displaced into contact with the spool member 72 permitting air to flow from container 12 into tire valve 66 for transmission therefrom into the tire through inlet/outlet ports 74. Check valve ball member 76 has a diameter greater than the width of spool member inlet/outlet port 74 and thus, when pressure in the container 12 is greater than the pressure experienced by tire valve 66 from the tire, check valve ball member 76 is displaced into contact with the spool member 72 to permit flow of relatively high pressure air through inlet/outlet ports 74 and passage through tire valve 66 into a tire or other object to be further inflated.

Washer 84 is provided for maintaining a tightened fit of the overall construction of check valve mechanism 70 with respect to tire valve connectors 68. Both the spool member 72 and washer 84 are insertable into tire valve connector lower section 90 with spool inlet/outlet ports 74 in fluid communication with tire valve connector conduit 92.

Spool member 72 is slidably insertable into spool insert chamber 88 as seen in FIG. 8 with check valve ball member 76 mounted within the hose adapter chamber 80. Hose adapter fluid flow conduit 78 is attached to fluid flow hose 64 in a manner as shown in FIG. 2.

In overall concept, when high pressure air or other gas has a pressure greater than that experienced by tire valve 66, high pressure air may flow from container or aerosol can 12 through aerosol fluid conduit 32 and actuator member flow conduit 30 into and through attached fluid flow hose 64, tire valve connector 68, spool inlet/outlet ports 74 of spool member 72 and then into tire valve 66 for transmission into the external object or tire.

Alternatively, when tire valve 66 experiences a pressure in the tire or other external object which is greater than the air/gas pressure in the container 12, check valve ball member 76 is displaced into blocking engagement with hose adapter fluid flow conduit 78 for terminating flow there through.

Although this invention has been described in connection with specific forms and embodiments thereof, it will be appreciated that various modifications other than those discussed above may be resorted to without departing from the spirit or scope of the invention as defined in the appended claims. For example, functional equivalent elements may be substituted for those specifically shown and described, certain features may be used independently of other features and in particular cases, particular locations of elements, steps or processes can be reversed or interposed, all without departing from the spirit or scope of the invention as defined in the appended claims.

What is claimed is:

1. A fluid actuation system adapted for controlling fluid flow from a container, comprising:
(a) an actuator housing;
(b) a cradle member fixedly secured to said actuator housing;
(c) an actuator member slidably insertable within said cradle member, said actuator member having an actuator member flow conduit for communicating fluid flow to an external environment; and,
(d) a toggle latch member in contact with an upper surface of said actuator member, said toggle latch member defining first and second ends, said toggle latch member being displaceable to: (1) a first position whereby a continuous flow of fluid is transmitted from said container to said external environment; (2) an adjustable second position for manually controlling an amount of said fluid being dispensed and, (3) a third position whereby flow of fluidic material from said container is blocked,
wherein said actuator member includes a stop element protruding from said upper surface of said actuator member for engaging said second end of said toggle latch member when said toggle latch member is rotated to said first position.

2. The fluid actuation system as recited in claim 1 wherein said actuator member is reversibly displaceable in a vertical direction within said cradle member responsive to said toggle latch member being displaced to said first position or said second position.

3. The fluid actuation system as recited in claim 1 wherein said toggle latch member is displaceable in a vertical direction and positionally located in abutting relationship to said upper surface of said actuator member when said toggle latch member is in said second position whereby pressing said first end of said toggle latch member displaces said actuator member for manual control of fluid flow from said container.

4. The fluid actuation system as recited in claim 1 wherein said cradle member includes a pair of opposing sidewalls, each of said pair of opposing sidewalls having a cradle stop member located at an upper end thereof for capturing said toggle latch member within said at least one cradle member channel.

5. The fluid actuation system as recited in claim 1 including a locking pin releasably coupled to said cradle member, said locking pin bearing against a lower surface of said actuator member for maintaining said toggle latch member in said third position and in abutting relation to an upper surface of said actuator member.

6. The fluid actuation system as recited in claim 5 where said cradle member includes a pair of opposing sidewalls, said pair of opposing sidewalls including a pair of aligned laterally displaced cradle openings for releasable and reversible insert of said locking pin through said pair of aligned laterally displaced cradle openings.

7. The fluid actuation system as recited in claim 1 including a fluid flow hose connected to and in fluid communication on a hose first end with said actuator member flow conduit.

8. The fluid actuation system as recited in claim 7 including a tire valve connector attached to a second end of said fluid flow hose and adapted to be releasably secured to a tire valve.

9. The fluid actuation system as recited in claim 1,
wherein said cradle member and said actuator housing are adapted to be releasably secured to said container, and
wherein said container is configured to store a fluidic composition for transmission of said fluidic composition to said actuator member through an aerosol fluid conduit in fluid communication with said actuator member flow conduit.

10. The fluid actuation system as recited in claim 9 wherein said cradle member includes a pair of opposing sidewalls, each of said pair of opposing sidewalls having at least one cradle member channel formed therein and extending in a vertical direction.

11. The fluid actuation system as recited in claim 10 wherein said toggle latch member is rotationally and slidably mounted within each of said cradle member channels.

12. The fluid actuation system as recited in claim 1 further comprising:
(a) a tire valve adapted for transmission of air therethrough;
(b) a tire valve connector for engaging said tire valve;
(c) a check valve mechanism for interfacing with said tire valve at one end of said check valve mechanism and a fluid flow hose at an opposing end of said check valve mechanism whereby fluid flow is transmitted to said tire valve when air pressure in said container is greater than air pressure in said external environment and fluid flow from said container is terminated when air pressure in said external environment is greater than said air pressure in said container.

13. The fluid actuation system as recited in claim 12 where said tire valve connector is threadedly connected to said tire valve for releasably coupling to said check valve mechanism.

14. The fluid actuation system as recited in claim 13 where said check valve mechanism includes:
(a) a spool member having an inlet/outlet port for transmitting air from said container to said tire valve when said air pressure in said container is greater than air pressure in said external environment; and,
(b) a check valve ball member displaceable in a hose adapter which is secured to said spool member for blocking and opening said inlet/outlet ports responsive to a pressure differential between said external environment and said container.

15. The fluid actuation system as recited in claim 14 where said hose adapter includes a hose adapter chamber where said check valve ball member is displaceable between said inlet/outlet port of said spool member and a hose adapter fluid flow conduit responsive to said pressure differential between said external environment and said container.

16. The fluid actuation system as recited in claim 15 where said spool member inlet/outlet port is in fluid communication with said hose adapter chamber and said hose adapter fluid flow conduit.

17. The fluid actuation system as recited in claim 16 wherein said spool member is fixedly mounted to said hose adapter at one end thereof.

18. A fluid actuation system adapted for controlling fluid flow from a container, comprising:
(a) an actuator housing;

(b) a cradle member fixedly secured to said actuator housing;
(c) an actuator member slidably insertable within said cradle member, said actuator member having an actuator member flow conduit for communicating fluid flow to an external environment and,
(d) a toggle latch member in contact with an upper surface of said actuator member, said toggle latch member defining first and second ends, said toggle latch member being displaceable to: (1) a first position whereby a continuous flow of fluid is transmitted from said container to said external environment (2) an adjustable second position for manually controlling an amount of said fluid being dispensed and, (3) a third position whereby flow of fluidic material from said container is blocked,
wherein said actuator member is reversibly displaceable in a vertical direction within said cradle member responsive to said toggle latch member being displaced to said first position or said second position, said actuator member including a stop element formed on said upper surface of said actuator member for contacting said second end of said toggle latch member when said toggle latch member is rotated to said first position to maintain a continuous flow of fluid, and
wherein said toggle latch member is displaceable in a vertical direction and positionally located in abutting relationship to said upper surface of said actuator member when said toggle latch member is in said second position whereby pressing said first end of said toggle latch member displaces said actuator member for manual control of fluid flow from said container, said toggle latch member including a toggle latch member opening for passage therethrough of said stop element when said toggle latch member is in said first or third positions and in abutting relation to said upper surface of said actuator member.

19. A fluid actuation system adapted for controlling fluid flow from a container, comprising:
(a) an actuator housing;
(b) a cradle member fixedly secured to said actuator housing;
(c) an actuator member insertable within said cradle member, said actuator member having an actuator member flow conduit for communicating fluid flow to an external environment; and,
(d) a toggle latch member in contact with an upper surface of said actuator member, said toggle latch member defining first and second ends, said toggle latch member being displaceable to: (1) a first position whereby a continuous flow of fluid is transmitted from said container to said external environment; (2) an adjustable second position for manually controlling an amount of said fluid being dispensed and, (3) a third position whereby flow of fluidic material from said container is blocked,
wherein said actuator member includes a stop element formed on said upper surface of said actuator member for contacting said second end of said toggle latch member when said toggle latch member is rotated to said first position, and
wherein said toggle latch member is positionally located in abutting relationship to said upper surface of said actuator member when said toggle latch member is in said second position whereby pressing said first end of said toggle latch member displaces said actuator member for manual control of fluid flow from said container, said toggle latch member including a toggle latch member opening for passage therethrough of said stop element when said toggle latch member is in said first or third positions and in abutting relation to said upper surface of said actuator member.

* * * * *